United States Patent
Smith

(10) Patent No.: US 10,663,124 B1
(45) Date of Patent: May 26, 2020

(54) PORTABLE LIGHT STAND ASSEMBLY

(71) Applicant: Donald Smith, Baltimore, MD (US)

(72) Inventor: Donald Smith, Baltimore, MD (US)

(*) Notice: Subject to any disclaimer, the term of this patent is extended or adjusted under 35 U.S.C. 154(b) by 0 days.

(21) Appl. No.: 16/437,588

(22) Filed: Jun. 11, 2019

(51) Int. Cl.
| F21S 6/00 | (2006.01) |
| F16M 11/24 | (2006.01) |
| F16M 11/26 | (2006.01) |
| F21S 2/00 | (2016.01) |
| F21S 9/02 | (2006.01) |
| F21V 23/04 | (2006.01) |
| F21V 21/06 | (2006.01) |
| F21V 21/30 | (2006.01) |

(52) U.S. Cl.
CPC ............ *F21S 6/006* (2013.01); *F16M 11/242* (2013.01); *F16M 11/26* (2013.01); *F21S 2/005* (2013.01); *F21S 9/02* (2013.01); *F21V 21/06* (2013.01); *F21V 21/30* (2013.01); *F21V 23/04* (2013.01)

(58) Field of Classification Search
CPC .......... F21V 21/22; F21V 21/30; F21V 21/26; F21V 21/28; F21V 21/29; F21V 21/06; F21V 23/04; F16M 11/242; F16M 11/26; F21S 2/005; F21S 9/02; F21S 8/08; F21S 8/085; F21S 8/086; F21S 8/088; F21S 6/006; F21W 2131/1005; F21W 2131/10; F21W 2131/105; F21Y 2105/00; F21Y 2105/10; F21Y 2105/12; F21Y 2105/14; F21Y 2105/16; F21Y 2105/18
USPC ..................................... 362/249.09, 431, 413
See application file for complete search history.

(56) References Cited

U.S. PATENT DOCUMENTS

| 2,551,753 | A | * | 5/1951 | McCullough | G03B 15/03 362/8 |
| 3,463,916 | A | * | 8/1969 | Debella | E04H 12/187 52/28 |
| 4,220,981 | A | * | 9/1980 | Koether | B60P 3/18 362/238 |
| 4,319,311 | A | * | 3/1982 | Mitchell | F21V 23/00 362/249.09 |
| 4,434,454 | A | * | 2/1984 | Day | A63J 17/00 362/2 |
| 4,450,507 | A | * | 5/1984 | Gordin | B60Q 1/24 362/249.01 |
| 5,272,609 | A | * | 12/1993 | Nelson | F21S 8/003 362/249.01 |
| 5,274,534 | A | * | 12/1993 | Armstrong | F21S 8/086 362/231 |
| 6,206,541 | B1 | | 3/2001 | Landamia | |
| 6,265,969 | B1 | | 7/2001 | Shih | |
| 6,637,904 | B2 | | 10/2003 | Hernandez | |
| D514,009 | S | | 1/2006 | Parr | |

(Continued)

*Primary Examiner* — Erin Kryukova

(57) ABSTRACT

A portable light stand assembly includes a pair of tripods and a pair of stands that is each slidably coupled to a respective one of the tripods. Each of the stands is removably attachable to one another when the tripods are positioned on a support surface. A plurality of lighting panels is each pivotally coupled to a respective one of the stands. Each of the lighting panels emits light for illuminating an area when the lighting panels are turned on. A pair of lighting disks is each pivotally coupled to a respective one of the stands. Each of the lighting disks emits light for illuminating the area when the lighting disks are turned on. Moreover, each of the lighting disks is positioned above the lighting panels on the respective stand.

15 Claims, 6 Drawing Sheets

(56) References Cited

U.S. PATENT DOCUMENTS

| | | | |
|---|---|---|---|
| 7,063,444 B2 | 6/2006 | Lee | |
| 7,782,223 B2 | 8/2010 | Lang | |
| 8,087,797 B2 | 1/2012 | Pelletier | |
| 8,342,714 B1 * | 1/2013 | Rea | F21V 11/183 |
| | | | 362/264 |
| 8,967,830 B1 * | 3/2015 | Winfrey | F21V 21/116 |
| | | | 362/145 |
| 10,393,324 B1 * | 8/2019 | Chambers | F21L 4/08 |
| 2002/0172043 A1 * | 11/2002 | Ching | F16M 11/10 |
| | | | 362/285 |
| 2006/0098424 A1 | 5/2006 | Yuen | |
| 2013/0322073 A1 * | 12/2013 | Hamm | F21V 21/06 |
| | | | 362/235 |
| 2015/0077967 A1 * | 3/2015 | Pellenc | H05B 33/0842 |
| | | | 362/20 |
| 2016/0108805 A1 * | 4/2016 | Ferguson | F02B 63/047 |
| | | | 290/1 B |
| 2016/0209015 A1 * | 7/2016 | Mumma | F21V 21/30 |
| 2016/0223173 A1 * | 8/2016 | Chauvet | F21V 21/116 |
| 2017/0211787 A1 * | 7/2017 | Sattler | F21S 6/008 |
| 2017/0234525 A1 | 8/2017 | Cate | |
| 2017/0299161 A1 * | 10/2017 | Boorom | F21V 21/26 |
| 2018/0163957 A1 * | 6/2018 | Zhou | F21V 21/06 |
| 2018/0266666 A1 * | 9/2018 | Liao | F21S 6/005 |
| 2019/0032867 A1 * | 1/2019 | Flesch | H02J 7/1423 |
| 2019/0178479 A1 * | 6/2019 | Liu | F21V 29/70 |
| 2019/0232707 A1 * | 8/2019 | Lucio | B42D 9/005 |

\* cited by examiner

PORTABLE LIGHT STAND ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to light devices and more particularly pertains to a new light device for illuminating a work area in a darkened environment.

BRIEF SUMMARY OF THE INVENTION

An embodiment of the disclosure meets the needs presented above by generally comprising a pair of tripods and a pair of stands that is each slidably coupled to a respective one of the tripods. Each of the stands is removably attachable to one another when the tripods are positioned on a support surface. A plurality of lighting panels is each pivotally coupled to a respective one of the stands. Each of the lighting panels emits light for illuminating an area when the lighting panels are turned on. A pair of lighting disks is each pivotally coupled to a respective one of the stands. Each of the lighting disks emits light for illuminating the area when the lighting disks are turned on. Moreover, each of the lighting disks is positioned above the lighting panels on the respective stand.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
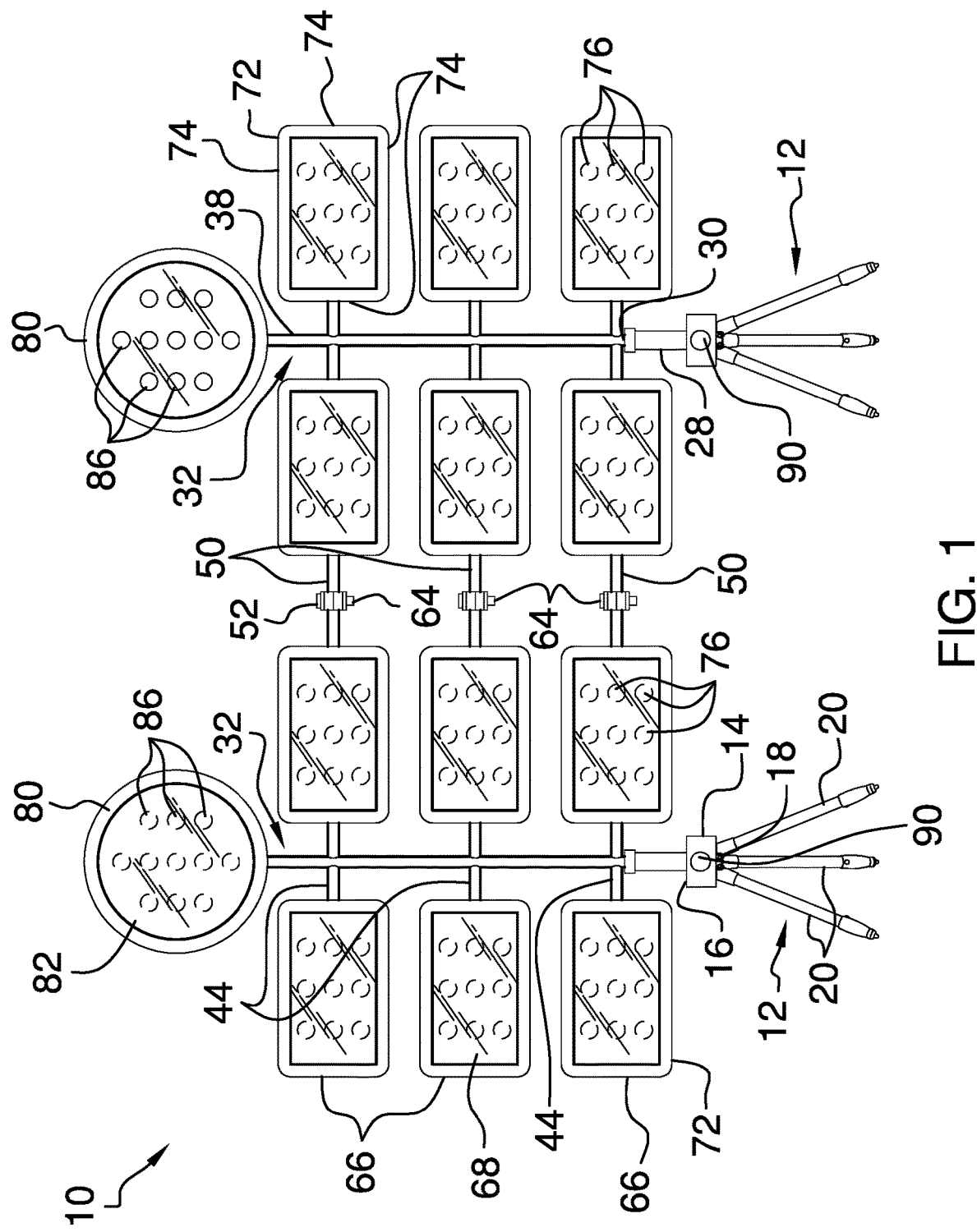
FIG. 1 is a front view of a portable light stand assembly according to an embodiment of the disclosure.
Figure 2:
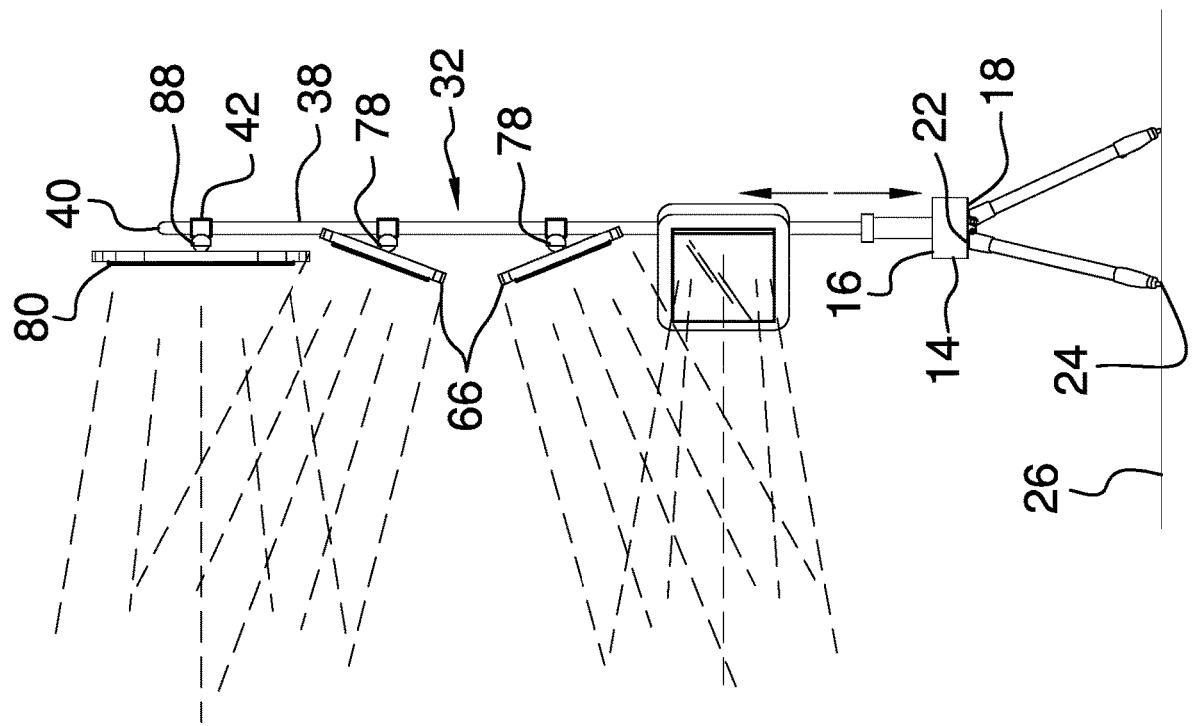
FIG. 2 is a left side view of an embodiment of the disclosure.
Figure 3:
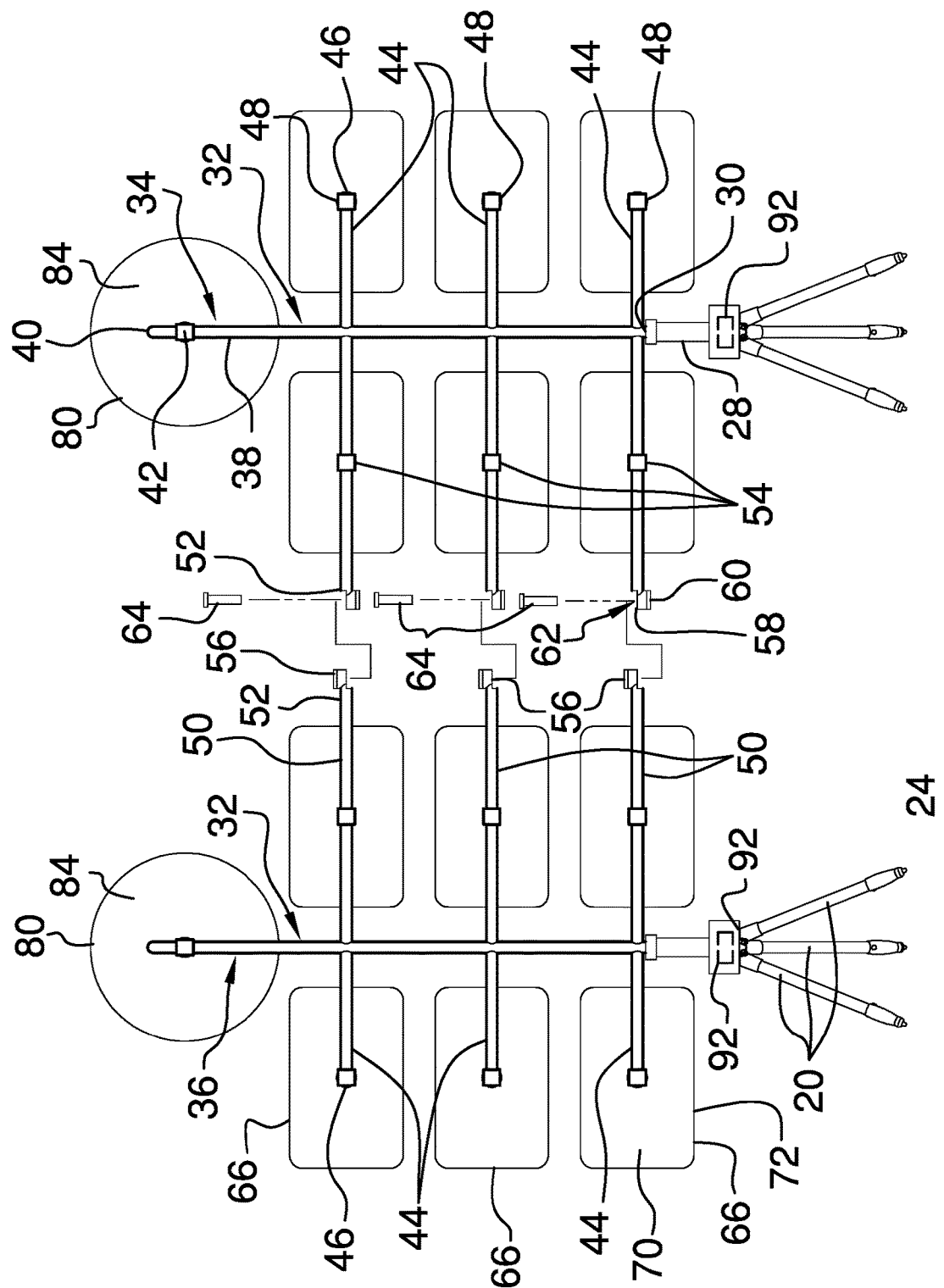
FIG. 3 is a back view of an embodiment of the disclosure.
Figure 4:
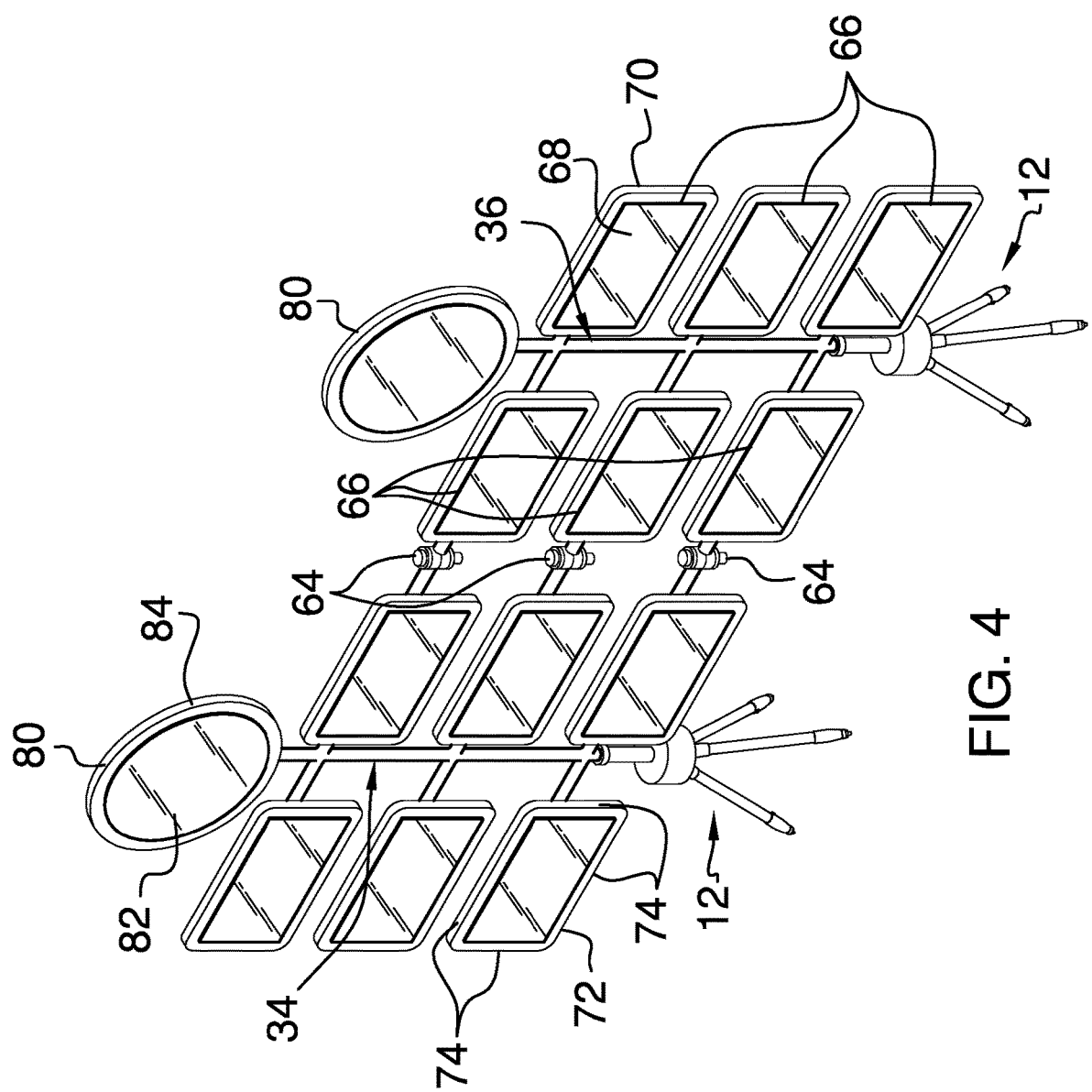
FIG. 4 is a top perspective view of an embodiment of the disclosure.
Figure 5:
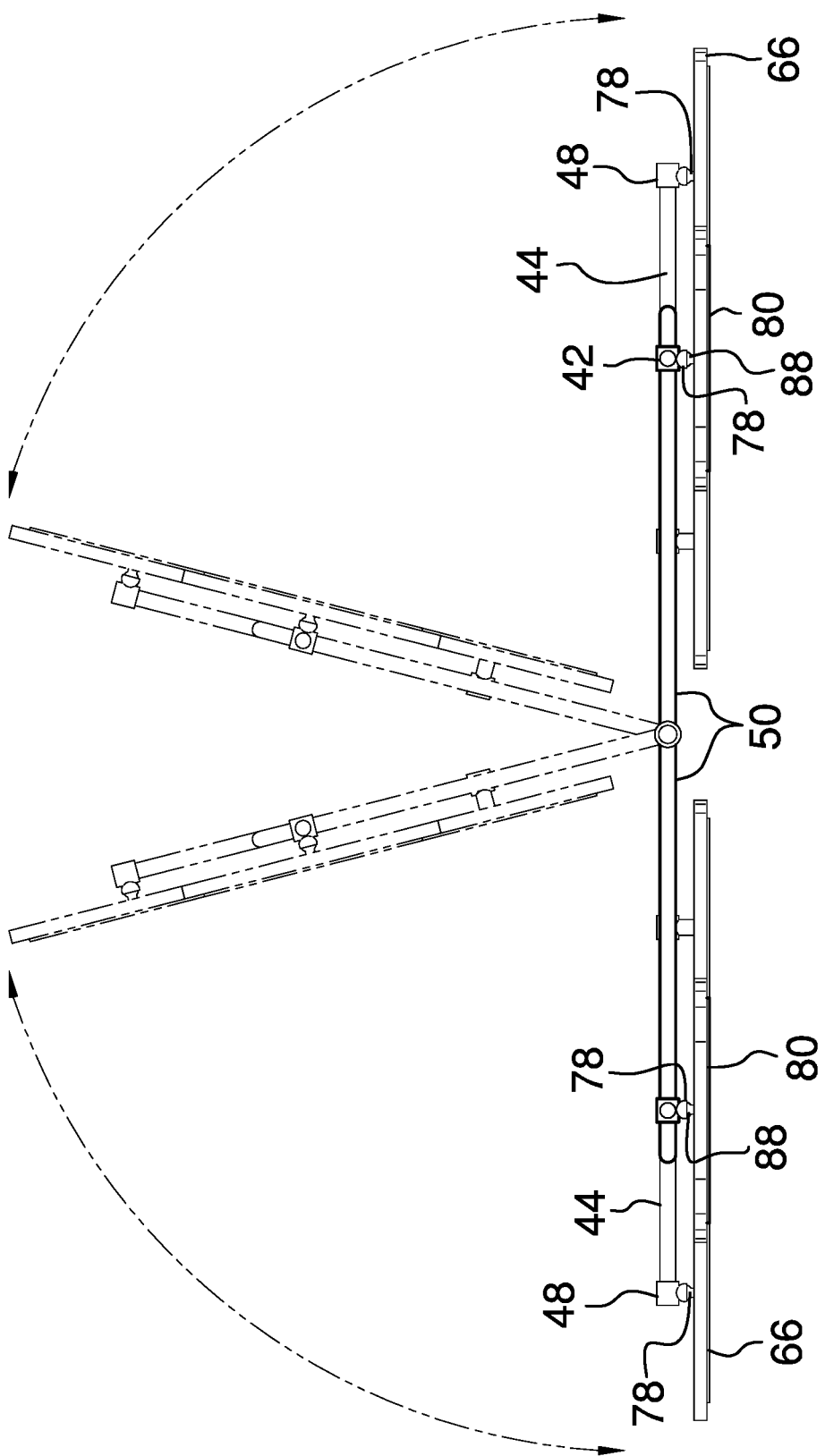
FIG. 5 is a top view of an embodiment of the disclosure.
Figure 6:
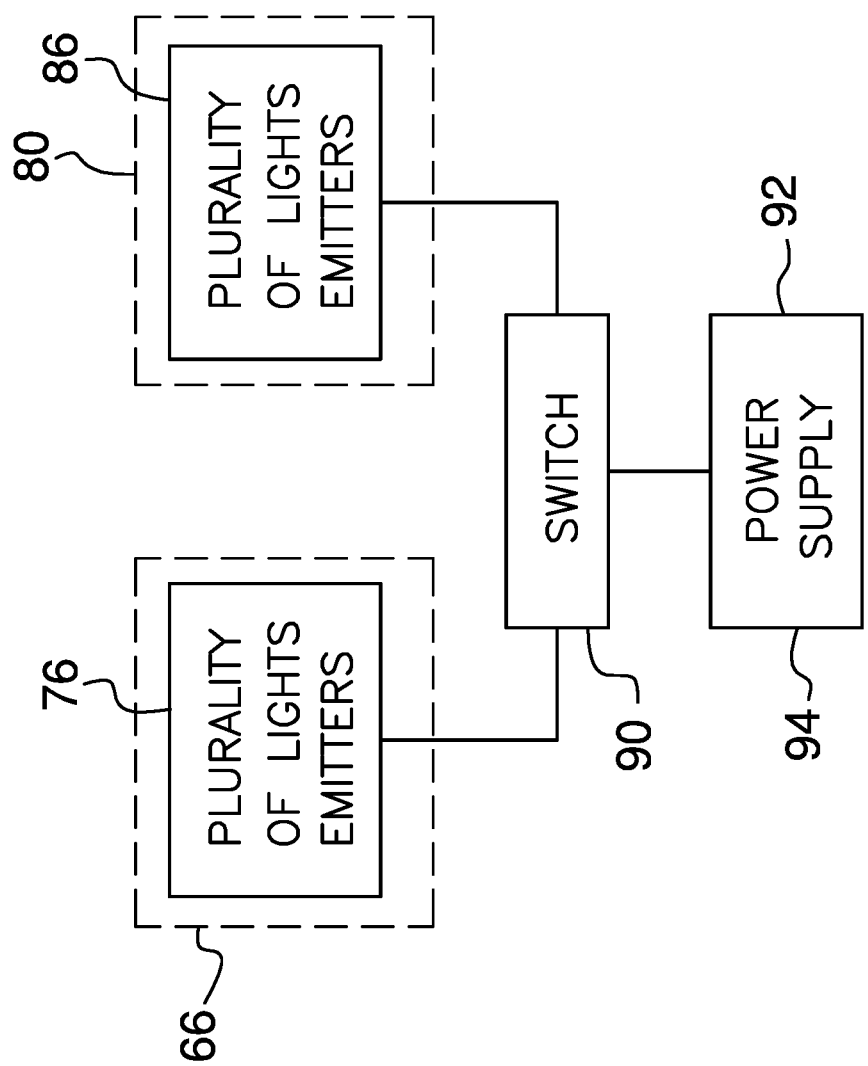
FIG. 6 is a schematic view of an embodiment of the disclosure.

With reference now to the drawings, and in particular to FIGS. 1 through 6 thereof, a new light device embodying the principles and concepts of an embodiment of the disclosure and generally designated by the reference numeral 10 will be described.

As best illustrated in FIGS. 1 through 6, the portable light stand assembly 10 generally comprises a pair of tripods 12 that are each of the tripods 12 is positionable between a collapsed position and a deployed position. Each of the tripods 12 comprises a cylinder 14 that has a top end 16 and a bottom end 18. The tripods 12 each include a plurality of legs 20 that each has an upper end 22 and lower end 24. The upper end 22 of each of the legs 20 is pivotally coupled to the bottom end 18 of the cylinder 14. Additionally, the legs 20 are spaced apart from each other and are distributed around a circumference of the bottom end 18.

Each of the legs 20 angles outwardly from the bottom end 18 of the cylinder 14 when the legs 20 are positioned in a deployed position. In this way the lower end 24 of each of the legs 20 abut a support surface 26 having the cylinder 14 being spaced from the support surface 26. Additionally, each of the legs 20 is positioned adjacent to one another when the legs 20 are positioned in a folded position. Each of the tripods 12 includes a tube 28 that is coupled to and extends upwardly from the top end 16 of the cylinder 14. The tube 28 is centrally positioned on the top end 16. the tube 28 has a distal end 30 with respect to the top end 16 of the cylinder 14.

A pair of stands 32 is included and each of the stands 32 is slidably coupled to a respective one of the tripods 12. Thus, the stands 32 are vertically oriented when the tripods 12 are positioned on a support surface 26. Each of the stands 32 is removably attachable to one another when the tripods 12 are positioned on the support surface 26. The pair of stands 32 includes a first stand 34 and a second stand 36.

Each of the first 34 and second 36 stands comprises an upright member 38 that is slidably inserted into the distal end 30 of the tube 28 having the upright member 38 being oriented to be collinear with a longitudinal axis of the tube 28. Additionally, the upright member 38 has a distal end 40 with respect to the tube 28. An upright receiver 42 is coupled to the upright member 38 and the upright receiver 42 is positioned closer to the distal end 40 of the upright member 38 than the cylinder 14. The upright receiver 42 may include a cup that is directed away from the upright member 38.

Each of the first 34 and second 36 stands includes plurality of first lateral members 44. Each of the first lateral members 44 is coupled to and extends away from the upright member 38. Moreover, each of the first lateral members 44 is oriented to extend along a line that is oriented perpendicular to a longitudinal axis of the upright member 38. The first lateral members 44 are spaced apart from each other and are distributed between the tube 28 and the distal end 40 of the upright member 38. Additionally, each of the first lateral members 44 has a distal end 46 with respect to the upright member 38. Each of the first 34 and second 36 stands includes a plurality of first receivers 48 that is each coupled to the distal end 46 of a respective one of the first lateral members 44. Each of the first receivers 48 may include a cup that is directed away from the respective first lateral member 44.

A plurality of second lateral members 50 is each coupled to and extends away from the upright member 38. Each of the second lateral members 50 is oriented to extend along a line that is oriented perpendicular to a longitudinal axis of the upright member 38. The second lateral members 50 are spaced apart from each other and are distributed between the tube 28 and the distal end 40 of the upright member 38. Additionally, each of the second lateral members 50 extends away from the upright member 38 in an opposite direction from the first lateral members 44. Each of the second lateral members 50 is aligned with a respective one of the first lateral members 44 and each of the second lateral members 50 has a distal end 52 with respect to the upright member 38.

Each of the first 34 and second 36 stands includes a plurality of second receivers 54 that is each coupled to a respective one of the second lateral members 50. Each of the second receivers 54 is centrally positioned between the upright member 38 and the distal end 52 of the respective second lateral member 50. Additionally, each of the second receivers 54 may include a cup that is directed away from the respective second lateral member 50. Each of the first 34 and second 36 stands includes a plurality of couplers 56 and each of the couplers 56 is coupled to the distal end 52 of a respective one of the second lateral members 50. Each of the couplers 56 has a top side 58 and a bottom side 60, and each of the couplers 56 has an aperture 62 extending through the top 58 and bottom 60 sides.

Each of the first 34 and second 36 stands has respective ones of the couplers 56 being associated therewith. As is most clearly shown in FIG. 3, each of the couplers 56 associated with the first stand 34 is positioned beneath a respective one of the couplers 56 that are associated with the second stand 36 when the first 34 and second 36 stands are positioned to be attached together. Thus, the aperture 62 in each of the couplers 56 associated with the first stand 34 is aligned with the aperture 62 in the respective coupler 56 that is associated with the second stand 36.

A plurality of pins 64 is provided and each of the pins 64 is extendable through the aperture 62s in respective ones of the couplers 56 when the couplers 56 associated with each of the first 34 and second 36 stands are aligned with each other. In this way the first 34 and second 36 stands are pivotally coupled together. As is most clearly shown in FIG. 5, the first 34 and second 36 stands can be oriented to form an angle with each other when the first 34 and second 36 stands are pivotally coupled together. As is most clearly shown in FIGS. 1 and 4, the first 34 and second 36 stands may be oriented to be collinear with each other when the first 34 and second 36 stands are pivotally coupled together.

A plurality of lighting panels 66 is provided and each of the lighting panels 66 is pivotally coupled to a respective one of the stands 32. Moreover, each of the lighting panels 66 emits light for illuminating an area when the lighting panels 66 are turned on. The lighting panels 66 on each of the stands 32 are arranged into a pair of columns on the stands 32. Each of the lighting panels 66 has a front side 68, a back side 70 and a perimeter edge 72 extending therebetween. The perimeter edge 72 has a plurality of intersecting sides 74 such that each of the lighting panels 66 has a rectangular shape. Additionally, the front side 68 of each of the lighting panels 66 has a plurality of light emitters 76 positioned thereon. Each of the light emitters 76 on each of the lighting panels 66 may comprise an LED or other electronic light emitter.

A plurality of attachments 78 is each coupled to the back side 70 of a respective one of the lighting panels 66. Each of the attachments 78 pivotally engages a respective one of the first 48 and second 54 receivers on a respective one of the first 44 and second 50 lateral members of a respective one of the first 34 and second 36 stands. Thus, each of the lighting panels 66 can be oriented at a selectable angle on the respective first 44 and second 50 lateral members of the respective first 34 and second 36 stands. In this way each of the lighting panels 66 can emit light in a selectable direction. Each of the attachments 78 may include a ball that is rotatably positioned in the cup of the respective first 48 and second 54 receivers.

A pair of lighting disks 80 is each pivotally coupled to a respective one of the stands 32 to emit light for illuminating the area when the lighting disks 80 are turned on. Each of the lighting disks 80 is positioned above the lighting panels 66 on the respective stand. Each of the lighting disks 80 has a forward side 82 and a rearward side 84. The forward side 82 of each of the lighting disks 80 has a plurality of light emitters 86 being positioned thereon. Each of the light emitters 86 on each of the lighting disks 80 may comprise an LED or other electronic light emitter.

A pair of disk attachments 88 is each coupled to the rearward side 84 of a respective one of the lighting disks 80. Each of the disk attachments 88 pivotally engages the upright receiver 42 on the upright member 38 of a respective one of the stands 32. It this way each of the lighting disks 80 can emit light in a selectable direction. Each of the disk attachments 88 may include a ball that is rotatably positioned in the cup of the upright receiver 42 on the upright member 38 of the respective stand 32.

A pair of switches 90 is each coupled to a respective one of the stands 32. Each of the switches 90 is electrically coupled to each of the lighting panels 66 and the lighting disk 80 on the respective stand 32 for turning the lighting panels 66 and the lighting disk 80 on the respective stand 32 on and off. A pair of power supplies 92 is each coupled to a respective one of the stands 32. Each of the power supplies 92 is electrically coupled to the switch 90 on the respective stand 32 and each of the power supplies 92 comprises at least one battery 94.

In use, the legs 20 on each of the tripods 12 are positioned in the deployed position and each of the tripods 12 is positioned on the support surface 26. Additionally, the tripods 12 are positioned proximate an object or area that is to be illuminated at night. The object may be a vehicle that has broken down on the side of a roadway or the like. The area may be any darkened area that needs to be illuminated for performing work or the like. Each of the first 34 and second 36 stands is positioned next to each other and each of the pins 64 is extended through respective couplers 56 to pivotally attach the first 34 and second 36 stands together. The lighting panels 66 and the lighting disk 80 on each of the first 34 and second 36 stands is pointed in a selected direction to illuminate the object or area in a variety ways. The switch 90 on each of the first 34 and second 36 stands is manipulated to turn on each of the lighting panels 66 and the lighting disks 80. In this way the object or the area are brightly illuminated to not only facilitate a user to perform work, but to also make the object or area clearly visible to observers. Thus, oncoming traffic with respect to the vehicle that is broken down on the roadway can clearly see the vehicle and thusly avoid potentially striking the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable light stand assembly being configured to be positioned on a support surface for illuminating a remote area, said assembly comprising:
   a pair of tripods, each of said tripods being positionable between a collapsed position and a deployed position;
   a pair of stands, each of said stands being slidably coupled to a respective one of said tripods such that each of said stands is vertically oriented when said tripods are positioned on a support surface, each of said stands being removably attachable to one another when said tripods are positioned on the support surface;
   a plurality of lighting panels, each of said lighting panels being pivotally coupled to a respective one of said stands wherein each of said lighting panels is configured to emit light for illuminating an area when said lighting panels are turned on, said lighting panels on each of said stands being arranged into a pair of columns on said stands; and
   a pair of lighting disks, each of said lighting disks being pivotally coupled to a respective one of said stands wherein each of said lighting disks is configured to emit light for illuminating the area when said lighting disks are turned on, each of said lighting disks being positioned above said lighting panels on said respective stand.

2. The assembly according to claim 1, wherein each of said tripods comprises:
   a cylinder having a top end and a bottom end;
   a plurality of legs, each of said legs having an upper end and lower end, said upper end of each of said legs being pivotally coupled to said bottom end of said cylinder, said legs being spaced apart from each other and being distributed around a circumference of said bottom end, each of said legs angling outwardly from said bottom end when said legs are positioned in a deployed position wherein said lower end of each of said legs is configured to abut a support surface having said cylinder being spaced from the support surface, each of said legs being positioned adjacent to one another when said legs are positioned in a folded position; and
   a tube being coupled to and extending upwardly from said top end of said cylinder, said tube being centrally positioned on said top end, said tube having a distal end with respect to said top end of said cylinder.

3. The assembly according to claim 2, wherein:
   said pair of stands includes a first stand and a second stand, each of said first and second stands comprising:
   an upright member being slidably inserted into said distal end of said tube having said upright member being oriented to be collinear with a longitudinal axis of said tube, said upright member having a distal end with respect to said tube; and
   an upright receiver being coupled to said upright member, said upright receiver being positioned closer to said distal end of said upright member than said cylinder.

4. The assembly according to claim 3, wherein each of said first and second stands comprises a plurality of first lateral members, each of said first lateral members being coupled to and extending away from said upright member, each of said first lateral members being oriented to extend along a line being oriented perpendicular to a longitudinal axis of said upright member, said first lateral members being spaced apart from each other and being distributed between said tube and said distal end of said upright member, each of said first lateral members having a distal end with respect to said upright member.

5. The assembly according to claim 4, wherein each of said first and second stands comprises a plurality of first receivers, each of said first receivers being coupled to said distal end of a respective one of said first lateral members.

6. The assembly according to claim 5, wherein each of said first and second stands comprises a plurality of second lateral members, each of said second lateral members being coupled to and extending away from said upright member, each of said second lateral members being oriented to extend along a line being oriented perpendicular to a longitudinal axis of said upright member, said second lateral members being spaced apart from each other and being distributed between said tube and said distal end of said upright member, each of said second lateral members extending away from said upright member in an opposite direction from said first lateral member, each of said second lateral members being aligned with a respective one of said first lateral members, each of said second lateral members having a distal end with respect to said upright member.

7. The assembly according to claim 6, wherein each of said first and second stands comprises a plurality of second receivers, each of said second receivers being coupled to a respective one of said second lateral members, each of said second receivers being centrally positioned between said upright member and said distal end of said respective second lateral member.

8. The assembly according to claim 7, wherein each of said first and second stands comprises a plurality of couplers, each of said couplers being coupled to said distal end of a respective one of said second lateral members, each of said couplers having a top side and a bottom side, each of said couplers having an aperture extending through said top and bottom sides, each of said first and second stands having respective ones of said couplers being associated therewith.

9. The assembly according to claim 8, wherein each of said couplers associated with said first stand being positioned beneath a respective one of said couplers being associated with said second stand when said first and second stands positioned to be attached together having said aperture in each of said couplers associated with said first stand being aligned with said aperture in said respective coupler being associated with said second stand.

10. The assembly according to claim 9, further comprising a plurality of pins, each of said pins being extended through said apertures in respective ones of said couplers when said couplers associated with each of said first and second stands are aligned with each other thereby pivotally coupling said first and second stands together.

11. The assembly according to claim 7, wherein:
each of said lighting panels has a front side, a back side and a perimeter edge extending therebetween, said perimeter edge having a plurality of intersecting sides such that each of said lighting panels has a rectangular shape, said front side of each of said lighting panels having a plurality of light emitters being positioned thereon; and
each of said first and second stands includes a plurality of attachments, each of said attachments being coupled to said back side of a respective one of said lighting panels, each of said attachments pivotally engaging a respective one of said first and second receivers on a respective one of said first and second lateral members of a respective one of said first and second stands thereby facilitating each of said lighting panels to be oriented at a selectable angle on said respective first and second lateral members of said respective first and second stands wherein each of said lighting panels is configured to emit light in a selectable direction.

12. The assembly according to claim 3, wherein:
each of said lighting disks has a forward side and a rearward side, said forward side of each of said lighting disks having a plurality of light emitters being positioned thereon; and
a pair of disk attachments, each of said disk attachments being coupled to said rearward side of a respective one of said lighting disks, each of said disk attachments pivotally engaging upright receiver on said upright member of a respective one of said stands wherein each of said lighting disks is configured to emit light in a selectable direction.

13. The assembly according to claim 1, further comprising a pair of switches, each of said switches being coupled to a respective one of said stands, each of said switches being electrically coupled to each of said lighting panels and said lighting disk on said respective stand for turning said lighting panels and said lighting disk on said respective stand on and off.

14. The assembly according to claim 13, further comprising a pair of power supplies, each of said power supplies being coupled to a respective one of said stands, each of said power supplies being electrically coupled to said switch on said respective stand, each of said power supplies comprising at least one battery.

15. A portable light stand assembly being configured to be positioned on a support surface for illuminating a remote area, said assembly comprising:
a pair of tripods, each of said tripods being positionable between a collapsed position and a deployed position, each of said tripods comprising:
a cylinder having a top end and a bottom end;
a plurality of legs, each of said legs having an upper end and lower end, said upper end of each of said legs being pivotally coupled to said bottom end of said cylinder, said legs being spaced apart from each other and being distributed around a circumference of said bottom end, each of said legs angling outwardly from said bottom end when said legs are positioned in an deployed position wherein said lower end of each of said legs is configured to abut a support surface having said cylinder being spaced from the support surface, each of said legs being positioned adjacent to one another when said legs are positioned in a folded position; and
a tube being coupled to and extending upwardly from said top end of said cylinder, said tube being centrally positioned on said top end, said tube having a distal end with respect to said top end of said cylinder;
a pair of stands, each of said stands being slidably coupled to a respective one of said tripods such that each of said stands is vertically oriented when said tripods are positioned on a support surface, each of said stands being removably attachable to one another when said tripods are positioned on the support surface, said pair of stands including a first stand and a second stand, each of said first and second stands comprising:
an upright member being slidably inserted into said distal end of said tube having said upright member being oriented to be collinear with a longitudinal axis of said tube, said upright member having a distal end with respect to said tube;
an upright receiver being coupled to said upright member, said upright receiver being positioned closer to said distal end of said upright receiver than said cylinder;
a plurality of first lateral members, each of said first lateral members being coupled to and extending away from said upright member, each of said first lateral members being oriented to extend along a line being oriented perpendicular to a longitudinal axis of said upright member, said first lateral members being spaced apart from each other and being distributed between said tube and said distal end of said upright member, each of said first lateral members having a distal end with respect to said upright member;
a plurality of first receivers, each of said first receivers being coupled to said distal end of a respective one of said first lateral members;
a plurality of second lateral members, each of said second lateral members being coupled to and extending away from said upright member, each of said second lateral members being oriented to extend along a line being oriented perpendicular to a longitudinal axis of said upright member, said second lateral members being spaced apart from each other and being distributed between said tube and said distal end of said upright member, each of said second lateral members extending away from said upright member in an opposite direction from said first lateral member, each of said second lateral members being aligned with a respective one of said first lateral members, each of said second lateral members having a distal end with respect to said upright member;
a plurality of second receivers, each of said second receivers being coupled to a respective one of said second lateral members, each of said second receivers being centrally positioned between said upright member and said distal end of said respective second lateral member;
a plurality of couplers, each of said couplers being coupled to said distal end of a respective one of said second lateral members, each of said couplers having a top side and a bottom side, each of said couplers having an aperture extending through said top and bottom sides, each of said first and second stands having respective ones of said couplers being associated therewith, each of said couplers associated with said first stand being positioned beneath a respective one of said couplers being associated with said second stand when said first and second stands positioned to be attached together having said aperture in each of said couplers associated with said first stand being aligned with said aperture in said respective coupler being associated with said second stand; and a plurality of pins, each of said pins being extended through said apertures in respective ones of said couplers when said couplers associated with each of said first and second stands are aligned with each other thereby pivotally coupling said first and second stands together;

a plurality of lighting panels, each of said lighting panels being pivotally coupled to a respective one of said stands wherein each of said lighting panels is configured to emit light for illuminating an area when said lighting panels are turned on, said lighting panels on each of said stands being arranged into a pair of columns on said stands, each of said lighting panels having a front side, a back side and a perimeter edge extending therebetween, said perimeter edge having a plurality of intersecting sides such that each of said lighting panels has a rectangular shape, said front side of each of said lighting panels having a plurality of light emitters being positioned thereon;

a plurality of attachments, each of said attachments being coupled to said back side of a respective one of said lighting panels, each of said attachments pivotally engaging a respective one of said first and second receivers on a respective one of said first and second lateral members of a respective one of said first and second stands thereby facilitating each of said lighting panels to be oriented at a selectable angle on said respective first and second lateral members of said respective first and second stands wherein each of said lighting panels is configured to emit light in a selectable direction;

a pair of lighting disks, each of said lighting disks being pivotally coupled to a respective one of said stands wherein each of said lighting disks is configured to emit light for illuminating the area when said lighting disks are turned on, each of said lighting disks being positioned above said lighting panels on said respective stand, each of said lighting disks having a forward side and a rearward side, said forward side of each of said lighting disks having a plurality of light emitters being positioned thereon;

a pair of disk attachments, each of said disk attachments being coupled to said rearward side of a respective one of said lighting disks, each of said disk attachments pivotally engaging upright receiver on said upright member of a respective one of said stands wherein each of said lighting disks is configured to emit light in a selectable direction;

a pair of switches, each of said switches being coupled to a respective one of said stands, each of said switches being electrically coupled to each of said lighting panels and said lighting disk on said respective stand for turning said lighting panels and said lighting disk on said respective stand on and off; and a pair of power supplies, each of said power supplies being coupled to a respective one of said stands, each of said power supplies being electrically coupled to said switch on said respective stand, each of said power supplies comprising at least one battery.

* * * * *